(12) United States Patent
Yang

(10) Patent No.: US 9,205,725 B1
(45) Date of Patent: Dec. 8, 2015

(54) AUTOMOTIVE WINDSHIELD AND SUNSHIELD COVER STRUCTURE

(71) Applicant: Ming-Shun Yang, Taipei (TW)

(72) Inventor: Ming-Shun Yang, Taipei (TW)

(73) Assignee: FORMOSA SAINT JOSE CORP., Taipei (TW)

( * ) Notice: Subject to any disclaimer, the term of this patent is extended or adjusted under 35 U.S.C. 154(b) by 0 days.

(21) Appl. No.: 14/621,338

(22) Filed: Feb. 12, 2015

Related U.S. Application Data

(63) Continuation-in-part of application No. 14/277,215, filed on May 14, 2014, now Pat. No. 9,150,088.

(51) Int. Cl.
*B60J 3/00* (2006.01)
*B60J 3/02* (2006.01)

(52) U.S. Cl.
CPC ..................... *B60J 3/0213* (2013.01)

(58) Field of Classification Search
CPC ............................... B60J 3/0213; B60J 11/08
USPC ................. 296/95.1, 136.01, 136.03, 136.07, 296/136.08, 136.1
See application file for complete search history.

(56) References Cited

U.S. PATENT DOCUMENTS

| 3,042,111 | A * | 7/1962 | Wytovich | 150/168 |
| 3,046,048 | A * | 7/1962 | Cheney | 296/95.1 |
| 4,821,785 | A * | 4/1989 | Rolan | 150/166 |
| 7,090,266 | B1 * | 8/2006 | Price | 293/128 |
| 7,673,924 | B1 * | 3/2010 | Lau | 296/95.1 |
| 8,656,968 | B2 * | 2/2014 | Lin | 150/168 |

\* cited by examiner

*Primary Examiner* — Joseph D Pape
(74) *Attorney, Agent, or Firm* — Pro-TECHTOR International Services; Ian B. Oglesby

(57) ABSTRACT

Provided is an automotive windshield and sunshield cover structure for removably covering a windshield of a vehicle. The automotive windshield and sunshield cover structure includes a windshield cover for removably covering a windshield of a vehicle, the windshield cover having an upper edge, two lateral sides extending from the upper edge, and a lower edge opposing the upper edge and connecting with the two lateral sides; a first extension portion extended outward from the windshield cover, disposed at one of the two lateral sides, and positioned proximate to the upper edge; a second extension portion extended outward from the windshield cover, disposed at another one of the two lateral sides, and positioned proximate to the upper edge; at least one reticular vent portion is formed on the windshield cover. The damage caused by sunlight, rain or snow can be prevented by the present invention.

3 Claims, 9 Drawing Sheets

AUTOMOTIVE WINDSHIELD AND SUNSHIELD COVER STRUCTURE

This application is a continuation-in-part application and claims benefit to U.S. application Ser. No. 14/277,215, filed on May 14, 2014. The previous application is still pending currently. The entirety of the aforementioned application is incorporated by reference.

BACKGROUND OF THE INVENTION

1. Technical Field

The present invention relates to automotive windshield and sunshield cover structures, and more particularly, to a shielding apparatuses for protecting vehicles or automotive windshields by preventing damage otherwise caused by sunlight, rain or snow.

2. Description of Related Art

As the demand for transport is on the rise, use of vehicles is ever-increasing, and thus automotive accessories and apparatuses are also in increasingly wide use. The aforesaid trend brings about the emergence of the shielding apparatuses for protecting vehicles or automotive windshields, for example, by preventing damage otherwise caused by sunlight, rain or snow.

Although the protective or shielding apparatuses for use with automotive windshield have been there for a long while, their conventional design remains unchanged, that is, a fabric that covers and is held with rods. The prior art goes without careful evaluation of reality. Not to mention that the fabric is often removed or lifted by gusts of wind, thereby failing to protect or cover the vehicle.

Accordingly, it is important for automotive accessory manufacturers to invent an automotive windshield and sunshield cover structure that prevents snow, water droplets, or foreign bodies from flowing into or seeping into a vehicle, blocks sunlight to protect meters, parts and components inside the vehicle and keep the vehicle cool on sunny days, and is suitable for mass production at low costs.

It is an objective of the present invention to provide an automotive windshield and sunshield cover structure which includes a windshield cover, a first extension portion and a second extension portion, and at least one reticular vent portion. The automotive windshield and sunshield cover structure is tightly and smoothly adhered to a vehicle body of a vehicle to cover a windshield of the vehicle, thereby preventing accumulation of snow and water and blocking sunlight. Alternatively, the automotive windshield and sunshield cover structure is adhered tightly to and engaged with a door receiving groove of the vehicle by the first magnetic strips to ensure that the automotive windshield and sunshield cover structure will not be removed or lifted by gusts of wind.

The present invention provides an automotive windshield cover structure, comprising: a windshield cover for removably covering a windshield of a vehicle, the windshield cover having an upper edge, two lateral sides extending from the upper edge, and a lower edge opposing the upper edge and connecting with the two lateral sides; a first extension portion extended outward from the windshield cover, disposed at one of the two lateral sides, and positioned proximate to the upper edge; and a second extension portion extended outward from the windshield cover, disposed at another one of the two lateral sides, and positioned proximate to the upper edge; wherein, the first extension portion and the second extension portion each encloses at least one first magnetic strip, respectively, and thus adhere to door receiving grooves on two opposing sides of the vehicle, respectively Implementation of an automotive windshield and sunshield cover structure of the present invention at least involves the following inventive steps: 1. The first magnetic strips assist the automotive windshield and sunshield cover structure in covering a windshield of the vehicle tightly and preventing snow or water droplets from accumulating on the windshield. 2. The automotive windshield and sunshield cover structure blocks sunlight to effectively cool the vehicle and protect meters, parts and components inside the vehicle.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENT OF THE INVENTION

Figure 1A:
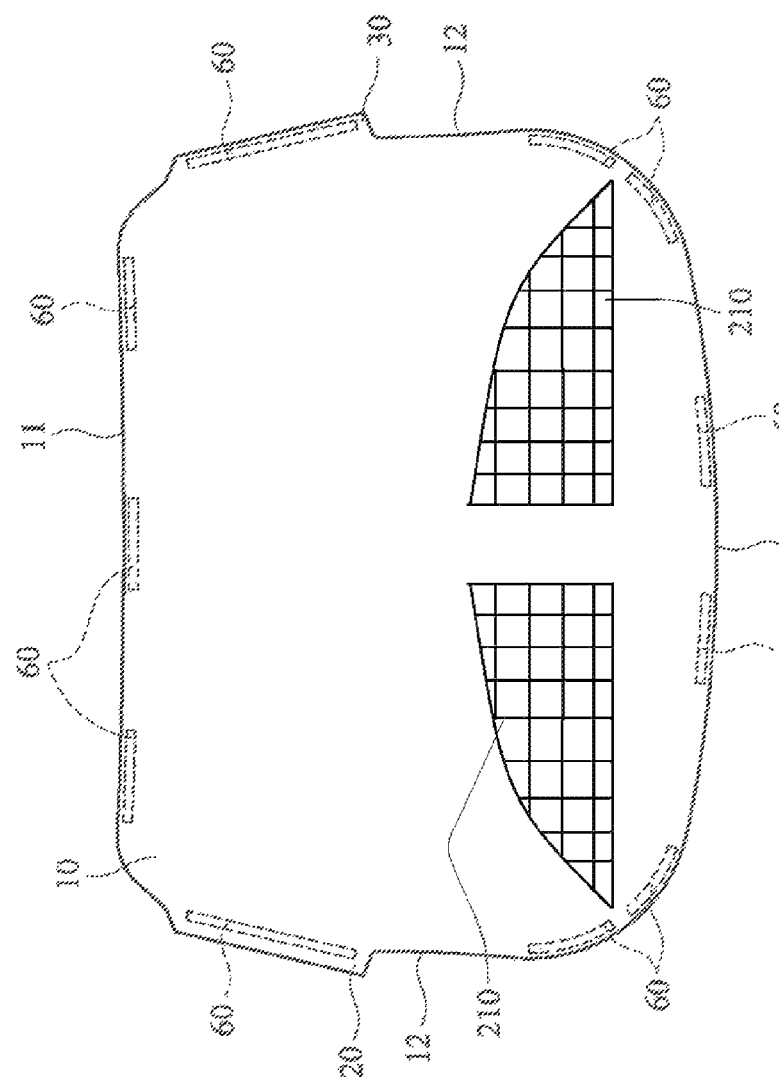
FIG. 1A is a schematic top view according to an embodiment of the present invention.

Referring to FIG. 1A, an automotive windshield and sunshield cover structure 100 is removably mounted on a windshield of a vehicle. The automotive windshield and sunshield cover structure 100 comprises a windshield cover 10, removably covers the windshield of the vehicle, the windshield cover 10 has an upper edge 11, two lateral sides 12 extending from the upper edge 11, and a lower edge 13 opposing the upper edge 11 and connecting with two lateral sides 12, the first extension portion 20 is extended outward from the windshield cover 10, disposed at one of the two lateral sides 12, the second extension portion 30 is extended outward from the windshield cover 10, disposed at the other one of the two lateral sides 12, and the windshield cover 10 can be formed by forming at least one reticular vent portion[21] 210.

In the present invention, the windshield cover 10 is large enough to cover the whole windshield and extends to a portion of a vehicle body of the vehicle, wherein the portion of the vehicle body surrounds the windshield.

In the present invention, the windshield cover 10 is preferably made of a waterproof material, an opaque material, or a waterproof and opaque material. When made of the waterproof material, the windshield cover 10 prevents snow or water from accumulating on the windshield and prevents the snow or water on the windshield from freezing. When made of the opaque material or the waterproof and opaque material, the windshield cover 10 also blocks sunlight to cool the vehicle and protect meters, parts and components inside the vehicle against damage otherwise caused by prolonged exposure to sunlight.

In the present invention, the first extension portion 20 can be inserted into a door receiving groove 80 disposed on one side of the vehicle.

In the present invention, the second extension portion 30 can be inserted into a door receiving groove 80 disposed on one side of the vehicle.

In the present invention, the reticular vent portion 210 is formed on the windshield cover 10, the reticular vent portion 210 is located on the position of the hood of the vehicle.

In the present invention, the first extension portion 20 and the second extension portion 30 each encloses at least one first magnetic strip 60, the first magnetic strips 60 disposed at the first extension portion 20 and the second extension portion 30 are coupled to a foamed body 90.

In the present invention, each of the first magnetic strips 60 enclosed in the first extension portion 20 and the second extension portion 30, can also be coupled to the foamed body 90 and a second magnetic strip 62 in a form that foamed body 90 is fixed in between the first magnetic strip 60 and the second magnetic strip 62.

In the present invention, the upper edge and the lower edge each encloses at least one first magnetic strip 60.

Figure 1B:
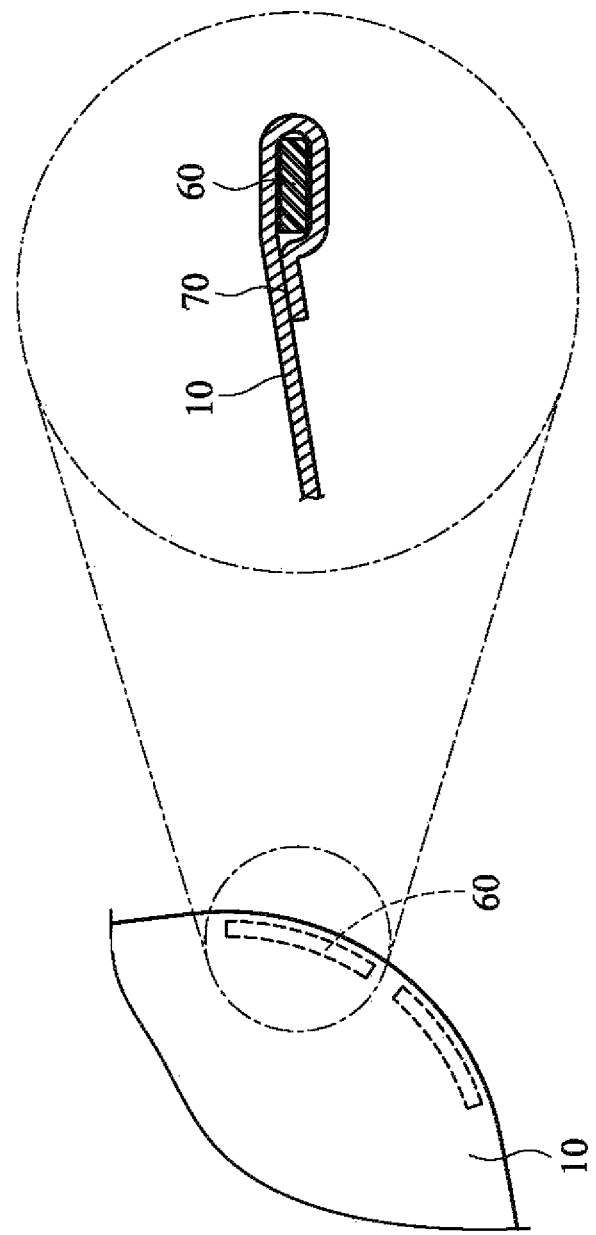
FIG. 1B is a schematic cross-sectional view of a first magnetic strip enclosed by a windshield cover according to the present invention.

Referring to FIG. 1B, each of the first magnetic strips 60 used by the automotive windshield and sunshield cover structure 100 is enclosed by the windshield cover 10. After enclosing the first magnetic strips 60, the windshield cover 10 joins itself at a joining portion 70 by means of sewing or machine sewing to prevent the first magnetic strips 60 from escaping.

Figure 1C:
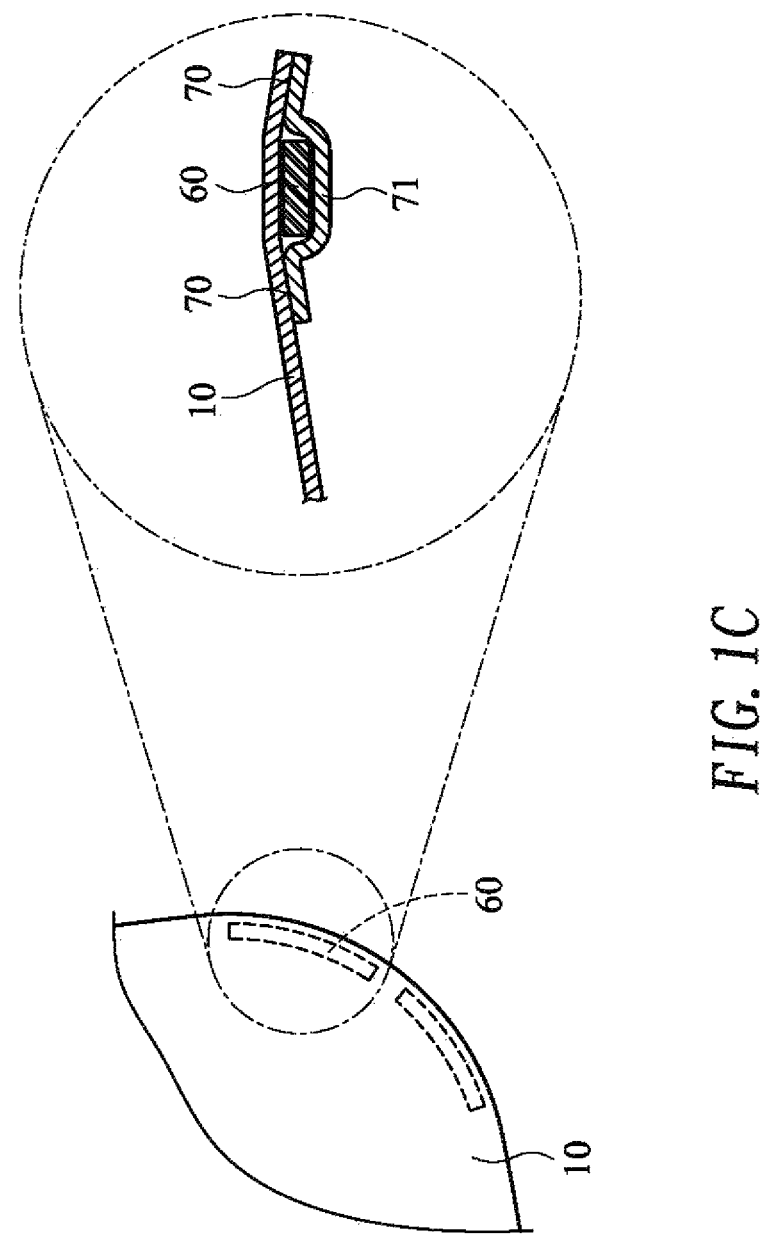
FIG. 1C is an another schematic cross-sectional view of a first magnetic strip enclosed by a windshield cover according to the present invention.
Figure 2:
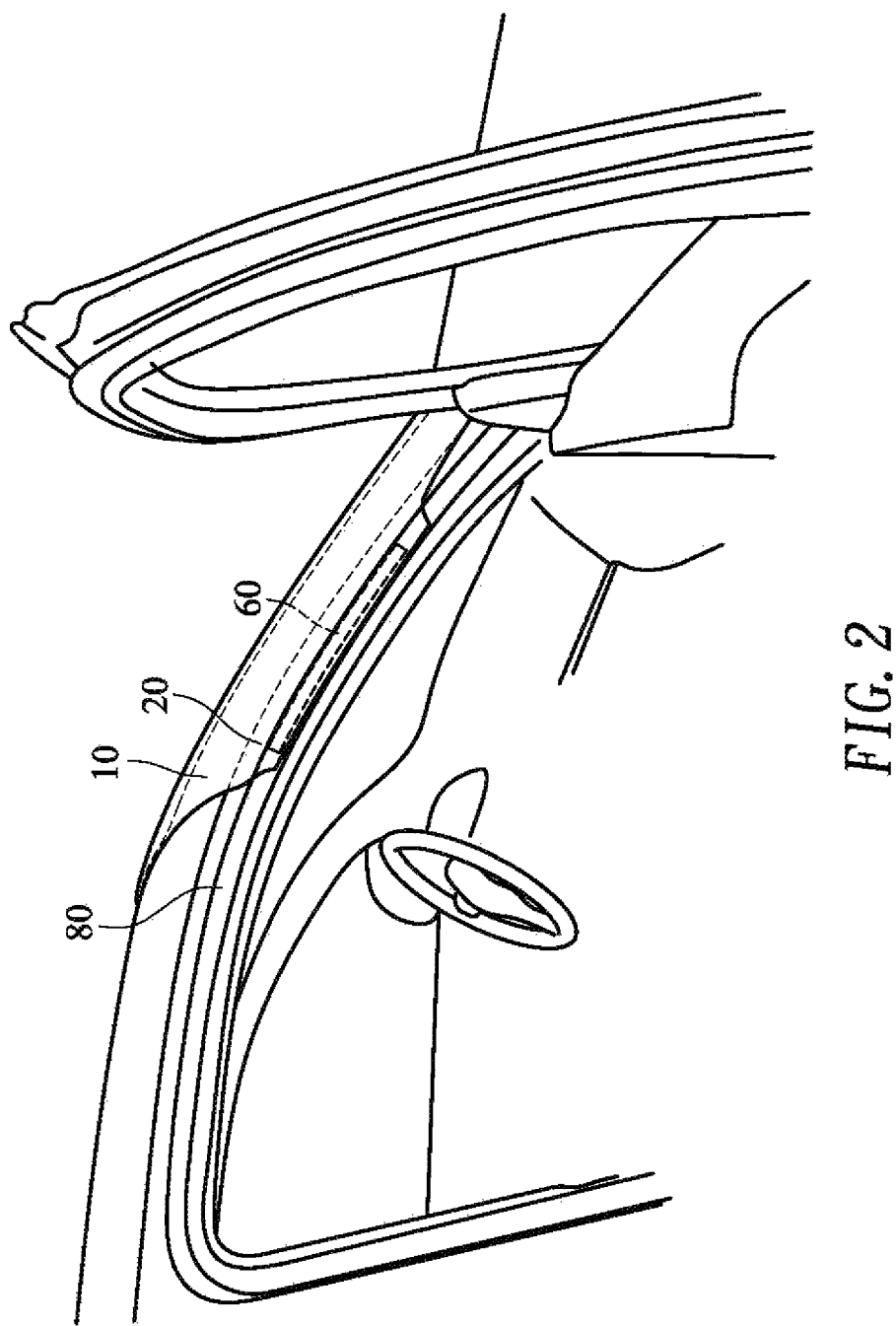
FIG. 2 is a schematic lateral perspective view which shows that the present invention is mounted on a windshield of a vehicle and a door receiving groove of the vehicle.
Figure 3:
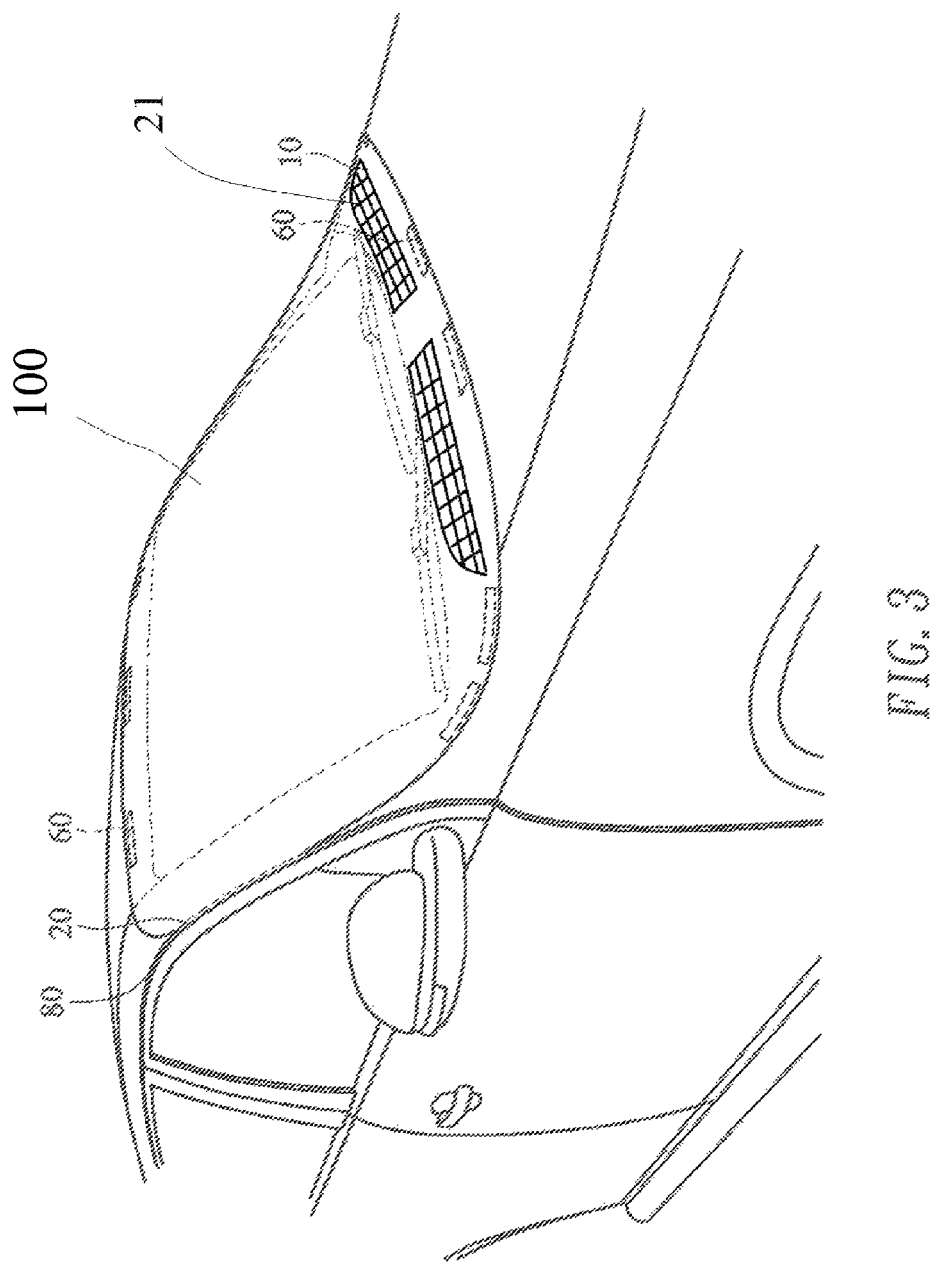
FIG. 3 is a schematic oblique perspective view which shows that the present invention is mounted on the windshield and the door receiving groove according to the present invention.

Referring to FIG. 1C, alternatively, it is practicable for the windshield cover 10 to enclose the first magnetic strips 60, by covering the first magnetic strips 60 with a flap 71 disposed at the border of the windshield cover 10, sewing the windshield cover 10 and the flap 71 together by machine sewing, and allowing the first magnetic strips 60 to be enclosed between the windshield cover 10 and the flap 71 to prevent the first magnetic strips 60 from escaping.

Referring to FIG. 1A and FIG. 1B, the first magnetic strips 60, which are not connected to each other, can be enclosed by the windshield cover 10 and disposed at the upper edge 11, the two lateral sides 12, the lower edge 13, a border of the first extension portion 20, and a border of the second extension portion 30 of the windshield cover 10.

Referring to FIG. 1A, in the present invention, the first magnetic strips 60 each can be formed from a rubber magnet which is flat and bendable. Moreover, the first magnetic strips 60 are provided in a manner that at least a said first magnetic strip 60 is disposed at each of the upper edge 11, the two lateral sides 12, the lower edge 13, the border of the first extension portion 20, and the border of the second extension portion 30.

Referring to FIG. 1A to 6B, with the first extension portion 20 being adhered to the door receiving grooves 80 by the first magnetic strips 60, the shutting of the door of the vehicle not only allows the first extension portion 20 to be clamped, but also prevents the automotive windshield and sunshield cover structure 100 from falling under gravity or being lifted by wind.

Similarly, with the second extension portion 30 being adhered to the door receiving groove 80 on the other side of the vehicle by the first magnetic strips 60, the shutting of the door of the vehicle not only allows the second extension portion 30 to be clamped, but also prevents the automotive windshield and sunshield cover structure 100 from falling under gravity or being lifted by wind.

Figure 4:
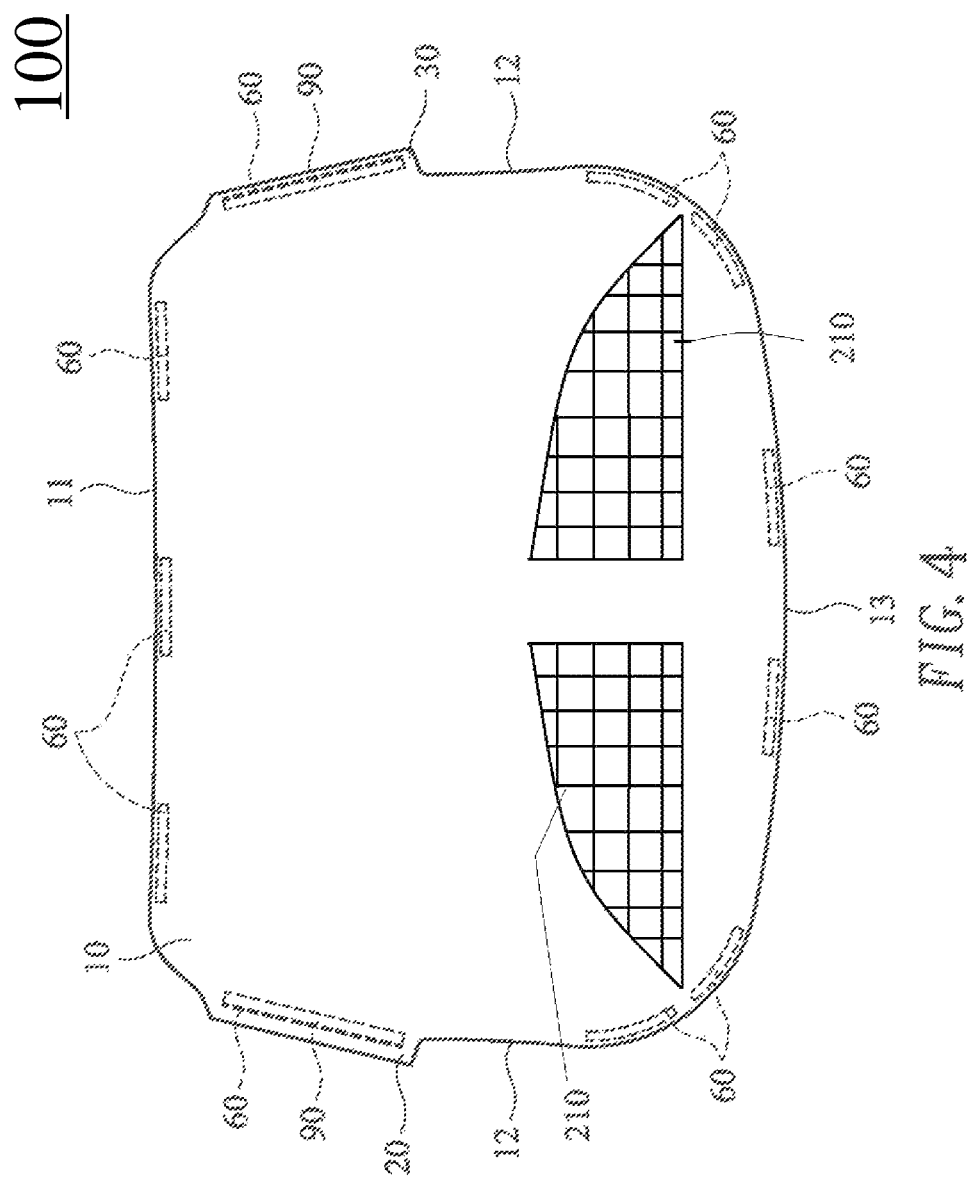
FIG. 4 is a schematic top view according to the present invention.
Figure 5:
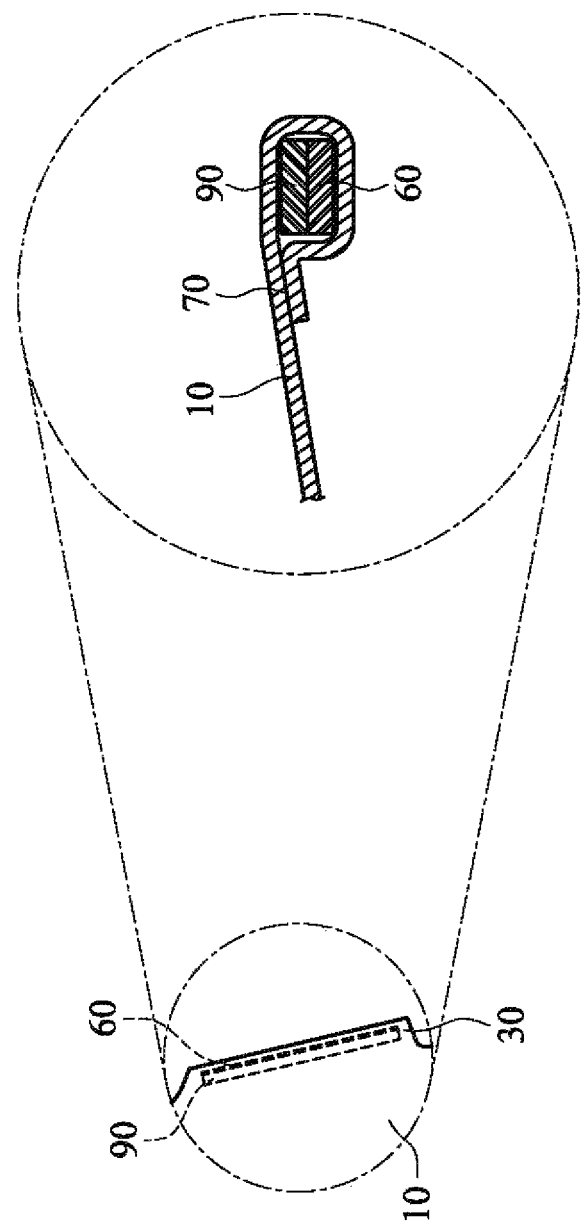
FIG. 5 is a schematic cross-sectional view of a second extension portion and its enclosed first magnetic strip according to the present invention.

Moreover, referring to FIG. 4 and FIG. 5, the first magnetic strips 60 disposed at the first extension portion 20 and the second extension portion 30 are coupled to a foamed body 90 which demonstrates resilience such that, as soon as the door of the vehicle shuts tightly, the first and second extension portions 20, 30 are not only clamped easily but also engaged with the door receiving grooves 80 and thus prevented from falling under gravity. The foamed body 90 is coupled to the first magnetic strips 60 by adhesion or any other means of connection.

Referring to FIG. 4 and FIG. 5, the first magnetic strips 60 are coupled to the foamed body 90 so as to be enclosed in the first extension portion 20 and the second extension portion 30. Hence, when the door of the vehicle shuts, not only can the first extension portion 20 and the second extension portion 30 of the automotive windshield and sunshield cover structure 100 be more tightly clamped, but the foamed body 90 is also resilient and thus compressible enough to impose no negative effect on how tightly the door shuts.

Figure 6A:
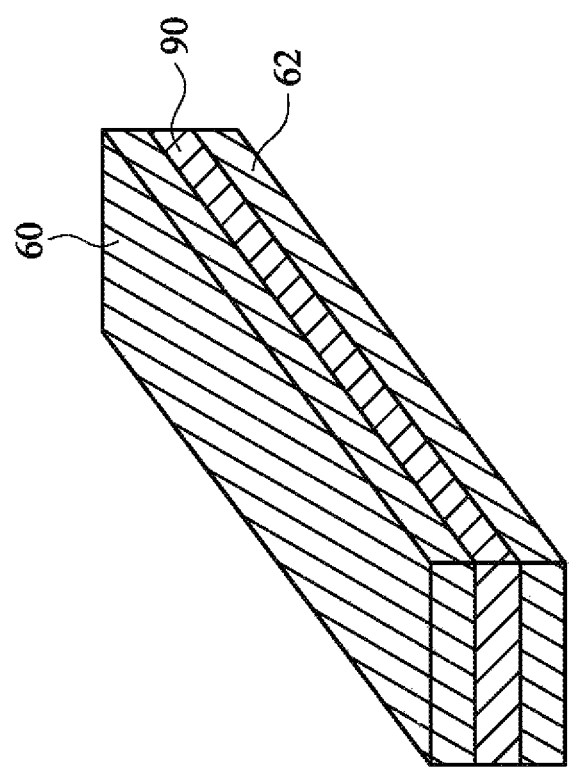
FIG. 6A is a schematic perspective view of a foamed body enclosed by a first magnetic and a second magnetic according to the present invention.
Figure 6B:
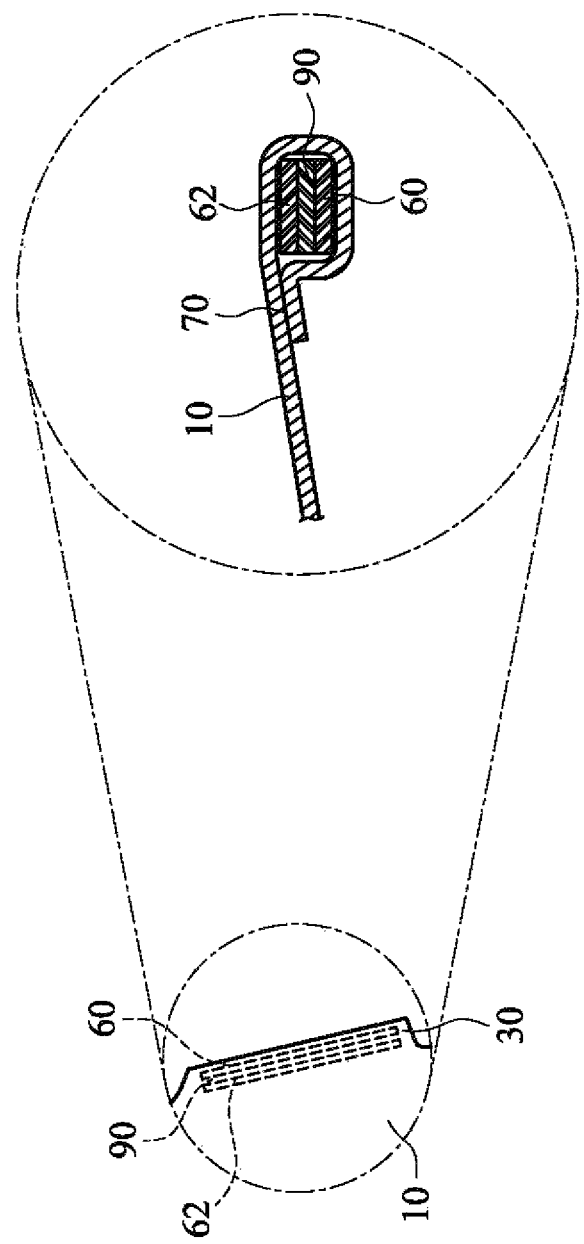
FIG. 6B is a schematic cross-sectional view of a first magnetic, a second magnetic, and a foamed body enclosed by a second extension portion.

Moreover, please refer to FIGS. 6A and 6B, each of the first magnetic strips 60 enclosed in the first extension portion 20 and the second extension portion 30, can also be coupled to the foamed body 90 and a second magnetic strip 62 in a form that foamed body 90 is fixed in between the first magnetic strip 60 and the second magnetic strip 62.

Moreover, referring to FIGS. 6A and 6B, with the foamed body 90 fixed in between the first magnetic strip 60 and the second magnetic strip 62, one does not have to choose the facing surface that is to cover the windshield when using the automotive windshield and sunshield cover structure 100, since when any of the two surfaces of the automotive windshield and sunshield cover structure 100 is used, there is always at least one first magnetic strip 60 or second magnetic strip 62 to attach the automotive windshield and sunshield cover structure 100 firmly in the door receiving grooves 80 of the vehicle.

In other words, there is no need for one to choose right surface from wrong surface when using the automotive windshield and sunshield cover structure 100, since both surfaces can be used to attach the automotive windshield and sunshield cover structure 100 firmly in the door receiving grooves 80 of the vehicle.

In the present invention, the first magnetic strip 60 can each be formed from a flat and bendable rubber magnet, and the second magnetic strip 62 can be formed from the flat and bendable rubber magnet.

In the present invention, thus, when the windshield of the vehicle is covered by the windshield and sunshield cover structure 100 and wind blows air inside between the windshield and the windshield and sunshield cover structure 100, the air can be vented through the reticular vent portion 210 to prevent the windshield and sunshield cover structure 100 from being raising and removing by the air, so as to protect the windshield.

As can be seen in the embodiments above, referring to FIG. 1A, FIG. 2, FIG. 3, FIGS. 6A, and 6B, the automotive windshield and sunshield cover structure 100, each with the first magnetic strip 60, or with the first magnetic strip 60 and the foamed body 90, or with the first magnetic strip 60 and the foamed body 90 and the second magnetic strip 62, can all be removably mounted on a windshield of a vehicle, preventing the windshield from stacking snow or water drops of rain, and attached firmly in the door receiving grooves 80 of the vehicle.

The embodiments described above are intended only to demonstrate the technical concept and features of the present invention so as to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. An automotive windshield and sunshield cover structure, comprising:
   a windshield cover for removably covering a windshield of a vehicle, the windshield cover having an upper edge, two lateral sides extending from the upper edge, and a lower edge opposing the upper edge and connecting with the two lateral sides;
   a first extension portion extended outward from the windshield cover, disposed at one of the two lateral sides, and positioned proximate to the upper edge;
   a second extension portion extended outward from the windshield cover, disposed at another one of the two lateral sides, and positioned proximate to the upper edge;
   at least one reticular vent portion is formed on the windshield cover, wherein the first extension portion and the second extension portion each encloses at least one first magnetic strip, wherein each of the first magnetic strips disposed at the first extension portion and the second extension portion is coupled to a resilient foamed body and a second magnetic strip, and the resilient foamed body is fixed in between the first magnetic strip and the second magnetic strip.

2. The automotive windshield and sunshield cover structure of claim 1, wherein the upper edge and the lower edge each encloses at least one first magnetic strip, respectively.

3. The automotive windshield and sunshield cover structure of claim 1, wherein the second magnetic strip is formed from a flat and bendable rubber magnet.

* * * * *